Aug. 26, 1969  G. H. ASBRIDGE  3,463,326
MANUFACTURE OF CRANKSHAFTS
Filed Nov. 6, 1967  2 Sheets-Sheet 1

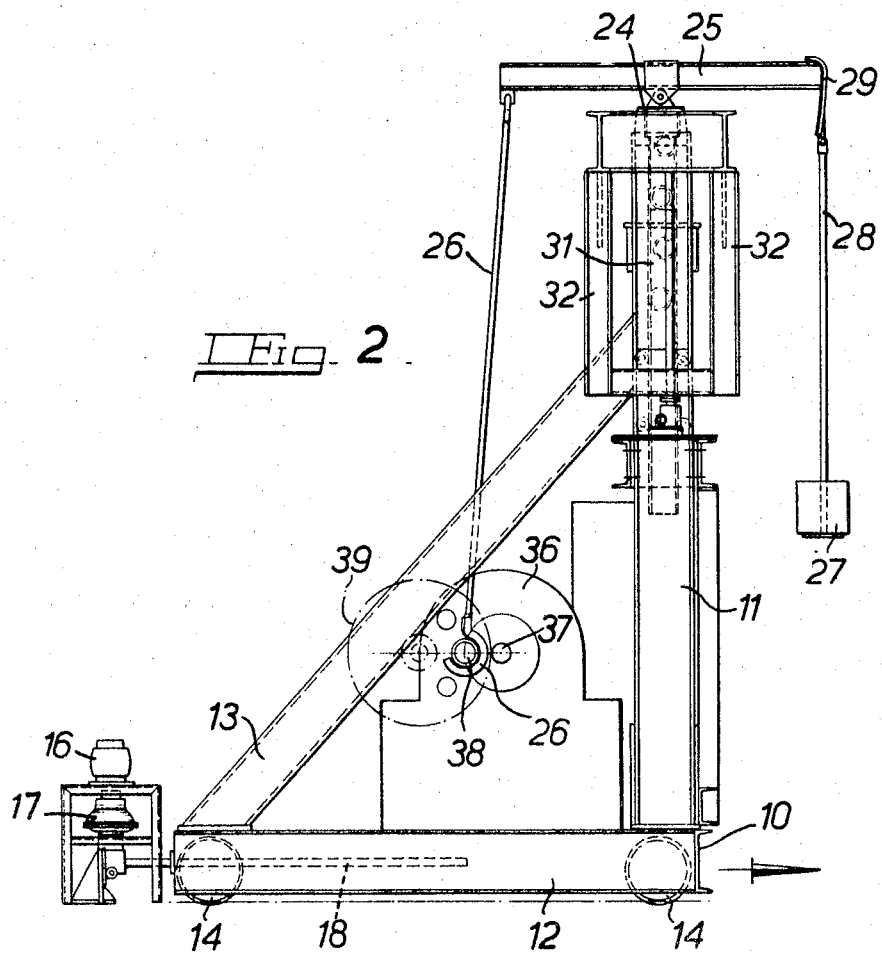

United States Patent Office  3,463,326
Patented Aug. 26, 1969

3,463,326
MANUFACTURE OF CRANKSHAFTS
George Herbert Asbridge, Shrewsbury, England, assignor to Mitchell Shackleton and Company Limited, Patricroft, Manchester, England, a British company
Filed Nov. 6, 1967, Ser. No. 680,896
Claims priority, application Great Britain, Dec. 6, 1966, 54,503/66; Feb. 11, 1967, 6,633/67
Int. Cl. B66c 23/72
U.S. Cl. 212—1        4 Claims

ABSTRACT OF THE DISCLOSURE

In the machining of a shaft of substantial length and weight in a machine in which the shaft is rotated while it is located between centres or equivalent means the shaft is suspended from an elevated support independent of the machine by mechanical means which continuously counterbalance the weight of the shaft as it rotates.

---

This invention relates to improvements in the manufacture of shafts and other members of substantial length and weight which have to be machined or otherwise finished to close limits.

Any shaft of substantial length when supported between centres or otherwise at its ends sags in the middle under its own weight, and if a central steady is used the shaft tends to form two catenaries between its supports and the steady.

The problem is particularly serious in the finish machining or grinding of the crank-pins of large crankshafts. In machining a crank-pin the shaft has to be mounted for rotation about the axis of the pin which is offset from that of the shaft by a distance equal to the crank throw, with the result that when the shaft is rotated there is an out-of-balance force created by the weight of the shaft and the major parts of the crank webs which must be eliminated by counter-balancing for accurate work.

Deflection of the shaft produced by this out-of-balance force is additional to the sag due to the weight of the shaft.

A crank-shaft for a large engine may weigh twenty tons or more, and with a crankshaft of that size the out-of-balance forces present a very serious problem.

It has been proposed to support a long shaft such as a crankshaft or calender roll during machining operations by spaced substantially vertical fluid-pressure cylinders suspended from an overhead track, the cylinders being connected to reservoirs in which the pressure of the fluid is maintained substantially constant and which are of such capacity that, in theory, the pressures in the cylinders and hence the upwardly directed forces applied to the shaft do not vary appreciably.

Apparatus of that kind is complicated and expensive and when a crankpin of a crankshaft is being machined and the pistons working in the fluid pressure cylinders are connected to the shaft journals the pistons reciprocate in the cylinders through a distance equal to twice the crank throw. In practice it would be impossible to ensure that the frictional resistance in all the cylinders and piston assemblies is the same, and the flow of fluid between the cylinders and the reservoirs could not take place rapidly enough to prevent substantial variations in the upward forces applied to different parts of the shaft as it rotates. Further, a large shaft may be in a machine for several days while different parts are being machined, and in the finish machining or grinding of the shaft it is essential that all the conditions should remain constant, both when the shaft is rotating and when it is stationary, which would be impossible with supporting means dependent on fluid pressure.

According to my invention a shaft rotatably mounted at its ends between centres or equivalent means for machining operations to be carried out on it is supported at one or more intermediate points in its length by means within or on which the shaft is free to rotate and to which is continuously applied by mechanical counterbalance means an upwardly directed force of sufficient magnitude to take the weight of the shaft and to prevent sagging or deflection.

In the operation of grinding or otherwise finishing a crank-pin of a heavy crankshaft the shaft is mounted at its ends for rotation about the axis of the crank-pin in the usual way, and the shaft journals are supported by mechanical means which continuously take the weight of the shaft while allowing it to rotate freely around the axis of the crank-pin.

Thus the weight of the shaft is transferred from the spindle of the machine to a stationary support which may be the floor or structure of the building, an overhead gantry, or the bed of machine, and the machine only has to provide for the rotation of the shaft and the grinding or other machining of the crank-pin as it carries no weight and does not have to cope with out-of-balance forces.

The means for supporting the weight of a shaft during machining operations may also be arranged to serve as a handling device for moving the shaft into and removing it from the machine.

One practical form of apparatus for handling and supporting a large crankshaft is illustrated diagrammatically in the accompanying drawings in which:

FIGURE 2 is an end elevation.

Figure 1:
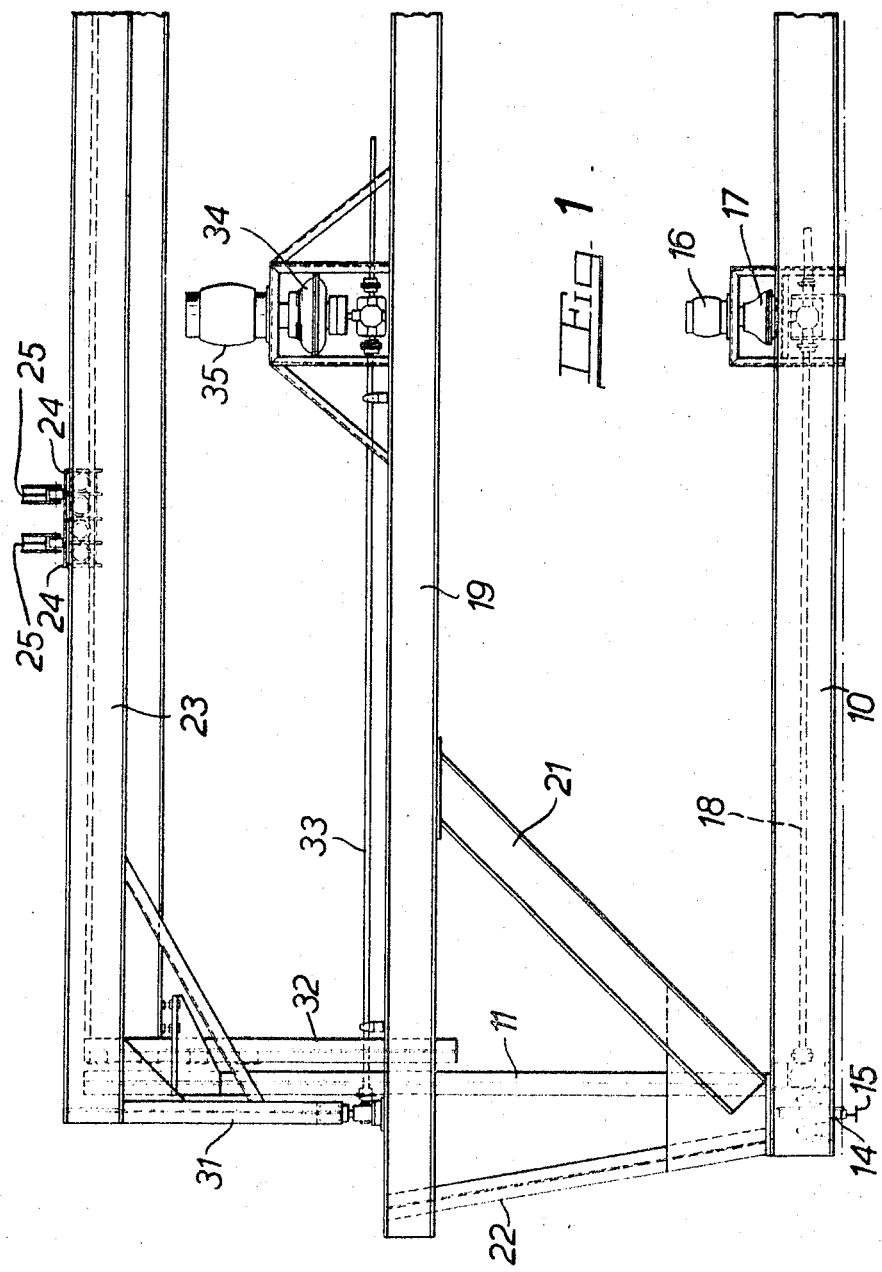
FIGURE 1 is a front elevation of the centre and one end of the apparatus.

The apparatus comprises basically a rigid gantry adapted to span a lathe or grinding machine in which operations are carried out on the shaft and which is bodily movable in a direction at right angles to the longitudinal axis of the machine.

The gantry illustrated comprises a longitudinal base member 10 of channel section and of a length greater than that of the machine and having at each end an upright or pillar 11 and a forwardly extending member 12, the pillars and the members 12 being rigidly braced by inclined members 13. Spaced flanged wheels 14 are housed in the members 12 and are adapted to run on rails 15 mounted on the floor of the workshop.

The wheels are driven by an electric motor 16 mounted on the base at the centre of its length or at any other convenient point and coupled to the wheels through a reduction gear-box 17 and horizontal shafts 18.

A rigid horizontal girder 19 is supported at a suitable height from the floor by the base member and pillars 11 reinforced by inclined stay members 21, 22.

An elevated horizontal track 23 above and parallel to to the girder 19 is supported at each end by parts slidably guided for vertical movement in the upper ends of the pillars 11. Trolleys 24 are arranged to travel on the track 23 and can be located in any desired position along the track. A rocking beam 25 extending at right angles to the track is pivotally mounted on each trolley. A connecting rod 26 is pivotally connected at its upper end to the forward end of each beam 25, and fixed on the lower end of the connecting rod is a part-circular hook 26. A counter-balance weight 27 is mounted on the lower end of a rod 28 attached by a flexible connecting member 29 to the rear end of the beam 25.

Vertical screw-jacks 31 located at opposite ends of the structure operate vertically movable assemblies 32 which, when raised, engage the rocking beams 25 on opposite sides of the track and lift the track, trolleys and rocking beams as a unit while holding the rocking beams and weight locked against angular movement during the lifting and/or lowering operation.

The screw-jacks are operated simultaneously by shafts 33 driven through a reduction gear-box 34 by an electric motor 35 mounted on the girder 19.

In FIGURE 2 the headstock of a lathe is indicated at 36, a crank-pin of a crankshaft at 37 and a journal of the shaft at 38.

To start operations a crankshaft to be machined is brought by any convenient means to a position in front of the machine, the supporting gantry is moved forwardly over the crankshaft and clear of the machine, and the track is lowered until the hooks 26 can be engaged around parts of the shaft. The track is then raised as described above to lift the shaft and the structure is moved rearwardly to bring the shaft into position for mounting in the machine.

If the operation is the grinding of a crankpin the shaft is mounted in the grinding machine for rotation about the axis of the pin and the hooks of the counter-balance means are engaged with the journals of the shaft at suitable points along the length of the shaft. The counterbalance weights are adjusted so that the whole of the weight of the crankshaft is taken by the gantry which transfers it directly to the floor, and the machine only has to deal with the centering and rotation of the shaft.

The crank-pin can then be ground to very close limits by a grinding wheel indicated at 39 in FIGURE 2.

As the shaft rotates the journal 38 travels in a circular path of which the radius is equal to the crank throw and this movement is accommodated by angular movement of the rocking beam 25 and vertical movement of the weight 27 without any appreciable change in the upward force.

Only one support is shown in FIGURE 2 but it will be understood that there will normally be a number of supports spaced along the shaft. The weights acting on the different hooks may be adjusted according to their position along the shaft but the sum of all the counter-balance weights will be substantially equal to the weight of the crankshaft so that no weight will be taken by the centres of other means by which the shaft is engaged at its ends and about which it is rotated.

When the grinding or other machining of a crank-pin has been completed the ends of the shaft can be disengaged from the machine and the shaft set in another angular position with a minimum of effort, the weight of the shaft being at all times supported from the structure so that the handling of the shaft is greatly facilitated and no other lifting gear is required.

The hooks 26 may be fitted with linings of material having a low co-efficient of friction and in an alternative arrangement they may be replaced by split bearing rings similar to the big-end bearings of engine connecting rods.

In a modified form of counter-balancing means the rocking beams 25 may be replaced by beams rigidly fixed to the trolleys. Pulleys are mounted on opposite ends of a beam and a hook or ring to receive the shaft is mounted on one end of a flexible cable which is carried up over the pulley and has a counter balance-weight on its other end.

In the embodiment illustrated the supporting gantry is carried by the floor of the workshop but where the necessary structure is already available it could be mounted on overhead rails in a manner similar to an overhead travelling crane.

Tests carried out on apparatus as described herein have shown that it enables the crank-pins and journals of heavy crankshafts to be readily ground or otherwise machined to very close limits.

I claim:
1. Apparatus for enabling accurate machining operations to be carried out on a shaft of substantial length and weight in a machine in which the shaft is mounted for rotation comprising an overhead track independent of the machine and parallel to the axis of the shaft, trolleys mounted on the track for longitudinal adjustment thereon, rocking beams pivotally mounted on the trolleys and extending at right angles to the axis of the shaft, a connecting rod pivotally mounted on one end of and depending from each beam, a hook or ring on the lower end of the connecting rod for receiving a portion of the shaft which is freely rotatable therein, and a counterbalance weight suspended from the other end of the beam, said counterbalance weight continuously applying upwardly directed forces to said hooks or rings such that deflections of the shaft under its own weight and by out-of-balance forces as it rotates are substantially eliminated.

2. Apparatus as in claim 1 wherein the sum of the upwardly directed forces is substantially equal to the downwardly directed force due to the weight of the shaft, whereby the machine is relieved of the weight of the shaft and only has to deal with the centering and rotation of the shaft.

3. Apparatus for enabling accurate machining operations to be carried out on a shaft of substantial length and weight in a machine in which the shaft is mounted for rotation comprising an overhead track independent of the machine and parallel to the axis of the shaft, trolleys mounted on the track for longitudinal adjustment thereon, transversely spaced pulleys on the trolleys, a flexible cable carried over the pulley on each trolley, a hook or ring one one end of each cable for receiving a portion of the shaft which is freely rotatable therein, and a counterbalance weight on the other end of said cable, said counterbalance weights continuously applying upwardly directed forces to said hooks or rings such that deflections of the shaft under its own weight and by out-of-balance forces as it rotates during the machining operations are substantially eliminated.

4. Apparatus as in claim 3 wherein the sum of the upwardly directed forces is substantially equal to the downwardly directed force due to the weight of the shaft, whereby the machine is relieved of the weight of the shaft and only has to deal with the centering and rotation of the shaft.

References Cited
UNITED STATES PATENTS

| | | | |
|---|---|---|---|
| 174,455 | 3/1876 | Thomas | 212—1 |
| 2,305,868 | 12/1942 | Groene | 212—135 |
| 2,518,776 | 8/1950 | Hampton | 212—48 |
| 2,551,174 | 5/1951 | Shipman | 254—139.1 |
| 2,918,180 | 12/1959 | Kendall | 212—135 |

EVON C. BLUNK, Primary Examiner

H. C. HORNSBY, Assistant Examiner

U.S. Cl. X.R.

212—49